United States Patent [19]
Plouzek

[11] 3,985,366
[45] Oct. 12, 1976

[54] DUO-CONE SEAL FLEXIBLE MOUNTING

[75] Inventor: Eugene Alan Plouzek, Tazewell County, Ill.

[73] Assignee: Caterpillar Tractor Co., Peoria, Ill.

[22] Filed: Oct. 6, 1975

[21] Appl. No.: 619,881

[52] U.S. Cl. .................................................. 277/92
[51] Int. Cl.² .......................................... F16J 15/34
[58] Field of Search ....................... 277/92, 94, 95

[56] References Cited
UNITED STATES PATENTS

| | | |
|---|---|---|
| 3,180,648 | 4/1965 | Kupfert et al. .......................... 277/92 |
| 3,195,421 | 7/1965 | Rumsey et al. ..................... 277/92 X |
| 3,322,431 | 5/1967 | Solari .................................... 277/92 |
| 3,463,560 | 8/1969 | Reinsma et al. ................... 277/92 X |
| 3,540,743 | 11/1970 | Ashton .................................. 277/92 |
| 3,547,452 | 12/1970 | Hirata .................................... 277/92 |

Primary Examiner—Samuel B. Rothberg
Attorney, Agent, or Firm—Phillips, Moore, Weissenberger, Lempio & Strabala

[57] ABSTRACT

A seal assembly has a pair of duo-cone seals positioned by a like pair of torics for axial loading. An insert member of flexible material is located within the member defining one of a pair of confronting inclined surfaces operatively containing the torics. The flexible insert members are not susceptible of oxidation when exposed to the atmosphere.

10 Claims, 3 Drawing Figures

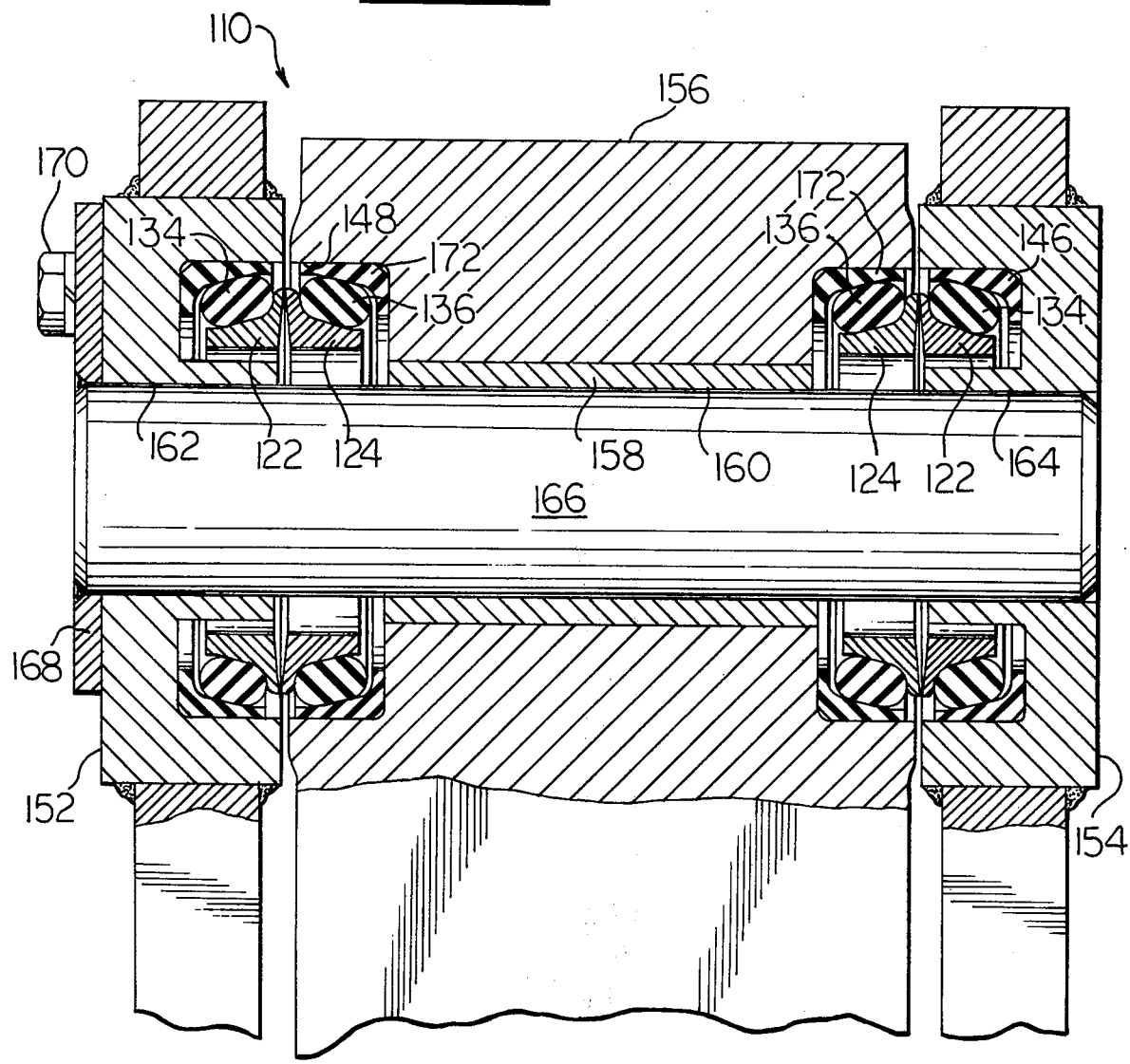
Fig_3_

DUO-CONE SEAL FLEXIBLE MOUNTING

BACKGROUND OF THE INVENTION

This invention is directed to seals of the kind employed for retaining lubricant and excluding foreign matter from the vicinity of the bearing surfaces between relatively moving parts. In particular, this invention is directed to face-type seals wherein sealing is accomplished by mating surfaces of relatively rotating seal parts of relatively hard material.

Numerous sealing configurations are available to provide rotatable seals between stationary and rotating members in environments such as those of track type vehicles, etc. Typical rotatable seal configurations are described in U.S. Pat. No. 3,108,648 to Kupfert et al.; 3,463,560 to Reinsma et al.; 3,524,654 to Hasselbacher et al., and 3,540,743 to Ashton, all assigned to the assignee hereof.

Such configurations generally employ dual cones and seal rings with axial loading of the seal rings accomplished by means of resilient load rings or torics. Tapered conical or inclined loading surfaces are formed along the outside diameter of the seal rings to receive the torics. A corresponding confronting inclined loading surface is positioned in parallel relation with the tapered surface of the seal ring so as to contain the toric therebetween. Axial loading of the seal rings is thus accomplished through the axial loading of the torics.

The present invention is described and illustrated herein in its application to the track roller of a track-type tractor which is subject to operation in dirt and dust environments which are highly destructive to seals. In an alternate embodiment, it is shown in application to a hinge joint, such as may be found in similar environments and in particular on track-type tracks.

It is well known that failure of track roller seals causes failure and destruction of other components of a roller long before expiration of its intended service life. Therefore, the improvement of seal life is of paramount importance in track roller and track design.

It should be noted that while the present invention as hereinafter described is in connection with tractors and particularly with tracks and track rollers, it may be more widely used. That is to say, the invention may be applicable to other usages which include seals of the type described.

Currently the surface of the member having a confronting inclined surface opposite the like surface of a duo-cone seal is machined from the generally ferrous material of the member, such as a track roller hub member. The surface is irregular and special tooling is needed to form the surface. Since the material that is involved is generally ferrous, oxidation occurs when it is exposed to the atmosphere and is subject to external loading. This oxidation results in a degradation of the surface and a possible loss of seal effectiveness.

SUMMARY AND OBJECTS OF THE INVENTION

It is therefore an object of the invention to provide a means for preventing oxidation of an inclined loading surface in a bearing assembly.

It is a further object of this invention to provide an insert member of non-ferrous, flexible material for use in a bearing assembly.

It is a further object of this invention to provide a replaceable insert member for use in a seal cavity which enables replacement of a seal surface of the assembly and minimizes cost.

It is a still further object to provide an insert member for a seal cavity which is flexible.

The invention takes the form of a rotatable face seal assembly having resilient torics disposed between confronting inclined loading surfaces of a ring seal and an insert member of flexible material which is positioned within an accommodating cavity. The insert member is of non-oxidizing material such as rubber or plastic.

Other objects and advantages of this invention will become more readily apparent from a review of the following description and attached drawings.

BRIEF DESCRIPTION OF THE DRAWINGS

FIG. 3 is a cross-sectional elevation view of a second embodiment of the invention shown in environment of a track link.

DETAILED DESCRIPTION

Figure 1:
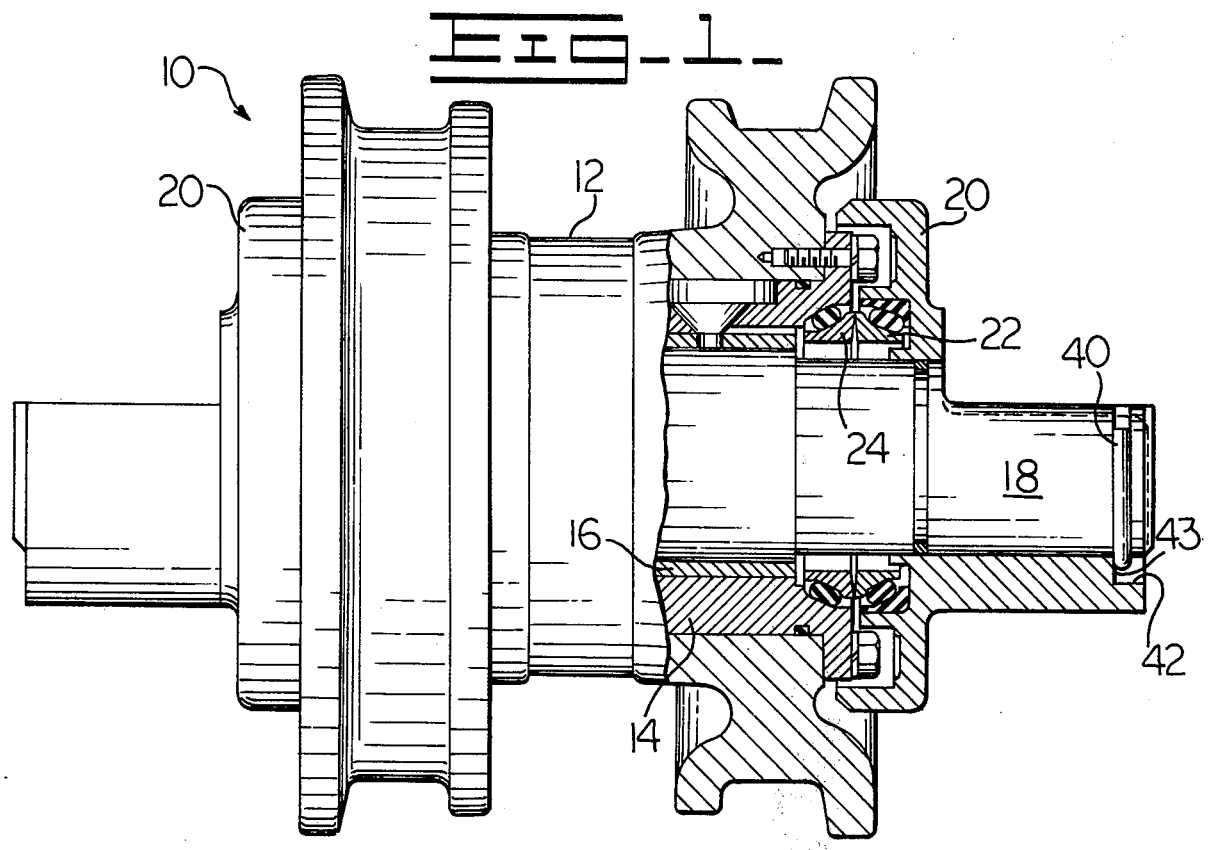
FIG. 1 is a central cross-sectional elevation view taken through a track roller of a track-type tractor illustrating the duo-cone seals and insert members of the present invention.
Figure 2:
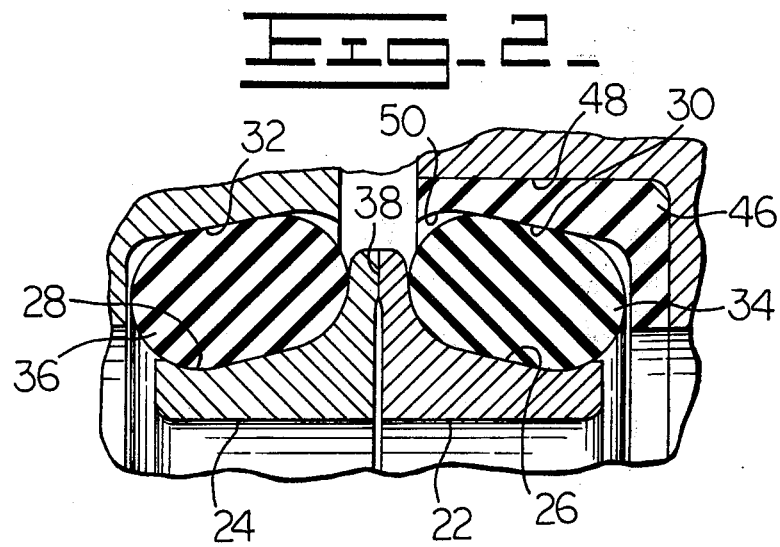
FIG. 2 is an enlarged view of the seal assembly and insert member of FIG. 1.

Turning to FIGS. 1 and 2, there is shown a track roller generally at 10 which comprises a conventional roller element 12 mounted on hub members 14, which in turn carry bearing bushings 16, all rotatable about a roller shaft 18. In use, the roller shaft is mounted between the truck frame of a crawler-type tractor through conventional means (not shown). End plates or collars 20 are mounted against rotation on the shaft and each end plate provides a support for a stationary seal ring 22, arranged coaxially and in face-to-face contact with a rotatable seal ring 24 supported by hub member 14.

Each of the seal rings 22, 24 is in the form of an annulus, as best seen in FIG. 2. The annulus comprises inclined outer loading surfaces 26, 28, included within cavities in the hub member 14 and end plate or collar 20 confronting inclined surfaces 30, 32, respectively. Each ring is supported by a toric 34, 36 of elastic material which is compressed between the confronting inclined surfaces. The angle of inclination of the surfaces is such that upon inward axial movement of end plate or collar 20, the torics act in the manner of a spring to bring seal rings 22 and 24 into face-to-face sealing contact under pressure along a band of contact 38 under pressure with a spring rate that is fairly constant during a large increment of axial movement. In other words, because of the gradual convergence of the inclined surfaces 26, 28, 30, 32, the rate of compressibility of the torics may be compared to the high rate of the spring which is effectively changed from its normal high rate to a very low rate over a wide range of movement of the assembled parts. Thus, it is barely necessary during assembly to move end collar 20 inwardly to a predetermined fixed position to obtain substantially uniform pressure at the contact faces of the seal rings. As seen in FIG. 1, the snap ring 40 is fitted in a groove 42 adjacent the end of shaft 18 and engaging shoulders 43 from an extension of the end collars.

As best seen in FIG. 2, confronting inclined surface 30 is formed by a generally ring-shaped insert member 46 which is fitted within a generally cylindrical cavity 48 within end collar 20. The insert member may conveniently be of flexible material, such as rubber or plastic.

An annular groove 50 formed on the interior of insert member 46 is adapted to receive toric 34 and assist in assembly of the seal assembly. By providing a flexible insert member of non-oxidizing material, the surface 30 resists degradation due to the conditions found in the working environment of the seal. In addition, the insert member may be easily replaced in the field if it becomes otherwise worn.

Turning now to FIG. 3, there is shown a second embodiment of the seal assembly of this invention which is shown for purposes of illustration in a track link. With this embodiment, a hinged joint shown generally at 110 is comprised of a link having a pair of bifurcated arms 152, 154 and a centrally disposed link 156. The centrally disposed link 156 includes a sleeve 158 having a through bore 160 therein. Bores 162, 164 are included within arms 152, 154, respectively. A hinge pin 166 extends through all of said bores to form a hinged joint. A flange 168, welded or otherwise fixed to one end of pin 166 is bolted in place by a bolt 170 for purposes of retention.

Intermediate each arm and the link is a seal assembly comprising a pair of duo-cone seals 122, 124. Torics 134, 136 serve to axially load the seal rings. With this embodiment, a pair of insert members 146, 172 are provided. In this manner, oxidation with respect to the inclined confronting surfaces contacting both torics of the pair is prevented.

It is to be understood that the foregoing description is merely illustrative of a preferred embodiment of the invention and that the scope of the invention is not to be limited thereto but is to be determined by the scope of the appended claims.

What is claimed is:

1. In a rotatable face seal assembly having a resilient toric disposed between confronting inclined loading surfaces of a pair of members, said members being operatively coupled to rotatable seal ring means to provide an axial force for effecting a rotatable seal, said members being axially movable relative to each other so as to contain the toric therebetween and allow contacting movement of the toric with respect to the inclined surfaces, the improvement comprising, an insert member of integral one-piece construction and being of flexible material within one of said members defining one of said confronting inclined surfaces, said insert member being descrete from and not bonded to said members so as to be removable therefrom.

2. The invention of claim 1 wherein said insert member is of non-oxidizing material.

3. The invention of claim 1 wherein said insert member is of resilient material.

4. The invention of claim 1 wherein a seal ring means defines the other of said confronting inclined surfaces.

5. The invention of claim 4 further including a second pair of members defining a second inclined loading surface and having a second toric therebetween, and wherein one member of said second pair of members is a second seal ring in face-to-face contacting relation with said seal ring of said first pair of members.

6. The invention of claim 5 further including a second insert member of flexible material within one of said second pair of members.

7. The invention of claim 6 wherein said insert members are of non-oxidizing material.

8. The invention of claim 6 wherein said insert members are of resilient material.

9. The invention of claim 6 wherein said insert members are located within the members defining the confronting surfaces opposite the surfaces defined by said seal rings.

10. The invention of claim 6 wherein said insert members are generally ring-shaped defining inner and outer diameters and having an annular groove on the inner diameter thereof adapted to receive said torics.

* * * * *